United States Patent
Heuft

(10) Patent No.: US 6,494,083 B1
(45) Date of Patent: Dec. 17, 2002

(54) METHOD FOR MONITORING CLOSED CONTAINERS

(75) Inventor: Bernhard Heuft, Burgbrohl (DE)

(73) Assignee: Heuft Systemtechnik GmbH, Burgbrohl (DE)

(*) Notice: Subject to any disclaimer, the term of this patent is extended or adjusted under 35 U.S.C. 154(b) by 0 days.

(21) Appl. No.: 09/744,524

(22) PCT Filed: Jul. 29, 1999

(86) PCT No.: PCT/EP99/05533

§ 371 (c)(1),
(2), (4) Date: Jan. 25, 2001

(87) PCT Pub. No.: WO00/06986

PCT Pub. Date: Feb. 10, 2000

(30) Foreign Application Priority Data

Jul. 29, 1998 (DE) .......................................... 198 34 185

(51) Int. Cl.$^7$ ................................................ G01M 3/34
(52) U.S. Cl. .............................. 73/49.3; 73/41; 73/45.4
(58) Field of Search ........................... 73/41, 45, 45.1, 73/45.2, 45.4, 49.3

(56) References Cited

U.S. PATENT DOCUMENTS

| | | | | |
|---|---|---|---|---|
| 3,591,944 A | * | 7/1971 | Wilcox .......................... 53/22 |
| 4,214,481 A | * | 7/1980 | Reutlinger .................... 73/462 |
| 5,392,636 A | * | 2/1995 | Blackwell ...................... 73/40 |
| 5,528,925 A | * | 6/1996 | Sherepa et al. ................. 73/41 |

FOREIGN PATENT DOCUMENTS

| | | |
|---|---|---|
| DE | 4004965 A1 | 8/1991 |
| DE | 4224540 A1 | 1/1994 |
| DE | 4308324 C1 | 4/1994 |
| DE | 19646685 A1 | 5/1998 |
| DE | 19651924 A1 | 6/1998 |

* cited by examiner

Primary Examiner—Hezron Williams
Assistant Examiner—Charles D Garber
(74) Attorney, Agent, or Firm—Gardner, Carton & Douglas

(57) ABSTRACT

To test the tightness and/or the correct closure of containers which are transported on a conveyor, the containers succeeding each other at brief time intervals and the containers being sealed by attachment of a closure, a characteristic dependent on the internal pressure (internal-pressure characteristic) of the container is measured. Upon attachment of the closures to the containers, the internal-pressure characteristic or parameters of the closures or containers, knowledge which is necessary to measure the characteristic depending on the internal pressure, are recorded. The containers are marked no later than when the closure is attached in a way which permits the values recorded upon attachment of the closures to be allocated to the respective container. The internal pressure of the container is ascertained from the value, measured at a time interval after the attachment of the closure, of the internal-pressure characteristic, and comparison with the value of the internal-pressure characteristic measured upon attachment of the closure or taking account of the parameters recorded. In the case of rigid containers such as glass bottles, the internal-pressure characteristic is typically the oscillation frequency of the closures; in the case of flexible containers such as PET bottles, on the other hand, it is the fill level. The marking can consist of a magnetization of the closure.

21 Claims, 2 Drawing Sheets

METHOD FOR MONITORING CLOSED CONTAINERS

CROSS-REFERENCE TO RELATED APPLICATIONS

This application is based upon and claims priority to PCT Patent Application No. PCT/EP99/05533, filed on Jul. 29, 1999, herein incorporated by reference in its entirety.

FIELD OF THE INVENTION

The invention relates to a method for testing the tightness and correct closure of a plurality of containers which are transported on a conveyor, the containers succeeding each other at brief time intervals, the containers being sealed by attaching a closure, and a characteristic of the containers which is dependent on the internal pressure (=internal-pressure characteristic) being measured at time intervals after the attachment of the closure.

BACKGROUND OF THE INVENTION

In the case of rigid containers such as glass bottles, the internal-pressure characteristic is typically the oscillation frequency of the closures, but in the case of flexible containers, such as PET bottles, it is the fill level.

Until now, the tightness of rigid containers, e.g. glass bottles which contain fruit juice or beer, has been tested by measuring the internal pressure. This test was carried out about 5 minutes after filling and closure. In the case of fruit juices which are poured in when hot, a negative pressure develops within this period due to cooling, whereas in the case of beer a slight positive pressure of 0.6 to 1.5 bar builds up due to the $CO_2$ which is released. In the case of fruit juices which are heated in a pasteurizer after closure, a higher pressure develops. It is known to ascertain this pressure by measuring the oscillation frequency of the container closure (DE-A-40 04 965 and DE-A-196 46 685). The measurements are encumbered with great uncertainty, as the measured frequency is evidently affected by other parameters, regarding which reference is made to the simultaneously filed international patent application "Method for Testing Sealed Containers" (=DE patent application 198 34 218.7).

The object of the invention is therefore, in the case of a method of the type described at the outset, to improve the reliability of the testing of the tightness or the closure.

SUMMARY OF THE INVENTION

According to the invention, this object is achieved in that:

during the attachment of the closures to the containers the internal-pressure characteristic is measured and/or parameters of the closures or containers are recorded, knowledge of which is necessary to ascertain the internal pressure from the measurement of the internal-pressure characteristic;

the containers are marked, no later than when the closure is attached, in a way which permits the values which are measured or recorded upon attachment of the closures to be allocated to the respective container, the internal pressure of the container is ascertained form the value of the internal-pressure characteristic measured at the time interval after the attachment of the closure and comparison with the value of the internal-pressure characteristic measured upon attachment of the closure, or taking into account the recorded parameters.

A criterion for the tightness or correctness of the closure is derived from the ascertained internal pressure value. Of course, the internal pressure need not be measured numerically. It is sufficient to ascertain a variable which is representative of the internal pressure, or else only to establish whether this variable lies above or below an empirically ascertained threshold value.

The fact that the internal-pressure characteristic of the containers is recorded when attaching the closures means that this recording takes place before the internal pressure rises or falls. If a parameter of the closures or containers is recorded, knowledge of which is necessary for the measurement of the internal-pressure characteristic, it is sufficient to record this parameter, as long as the respective container can be tracked and an allocation is therefore still possible.

The period between attaching the closures and measuring the internal-pressure characteristic can be so great that a large number of containers can be transported on the conveyer within this period.

In the case of drinks containing $CO_2$, the measurement takes place e.g. after 10 minutes. In the case of fruit juices which are pasteurized, the internal-pressure characteristic can be measured after the pasteurizer.

With the process alternative, in which the internal-pressure characteristic is recorded when attaching the closures to the containers, this characteristic is measured twice, namely the first time when attaching the closures to the containers and the second time after the time interval mentioned. The first measurement then corresponds to the internal pressure zero, so that this value essentially depends only on the properties of the closure and/or cap (=closure parameters). The deviation of the value obtained during the second measurement from the value obtained during the first measurement is therefore almost exclusively attributable to the change in the internal pressure, so that the difference in the measured value shows, directly and in general even linearly, the increase or reduction in the internal pressure.

If, on the other hand, the properties of the closure and/or the cap (=closure parameters) are recorded when attaching the closures to the containers, the internal pressure is then ascertained during the later measurement of the internal-pressure characteristic from the measured value of this characteristic, by means of empirical values which are stored in value tables for the parameters. Each cap and/or additionally each closure type then has, so to speak, its own parameter set and threshold value for the measured frequency in the case of rigid containers or of the fill level in the case of plastic containers, with which the ascertained frequency or the ascertained fill level are compared. The influence of the properties of the closure blank or attached closure, e.g. material thickness and compound quantity), and of the properties of the closure chuck, e.g. the closure force, on the oscillation frequency of the attached closure is described in the simultaneously filed international patent application "Method for Testing Sealed Containers" (=DE patent application 198 34 218.7).

The marking of the containers makes possible a permanent allocation to the individual containers of the value of the characteristic recorded when attaching the closure or of the other parameters.

The measured values and the parameters can be attached direct to the container by means of the marking.

Another possibility consists of consecutively numbering the containers by means of the marking and then storing with each container number in a computer the internal-pressure characteristic measured during the attachment of the closure or the recorded closure parameters. The consecutive numbering can take place periodically as, by and large, the containers are moved along or emerge from the pasteurizer in turn. If the containers are already continuously or periodically numbered, this numbering can be used for the allocation of the recorded value or parameters to the containers.

In the case of rigid containers such as glass bottles, however, the marking preferably contains only information about the oscillation frequency of the closure as ascertained during the first measurement, the first measurement in general taking place directly after closure. As indicated, this oscillation frequency depends primarily on the type of closure and the closure force of the closure chuck (=closure parameters). At the second measurement, if e.g. a positive pressure has built up in a beer bottle sealed with a crown cap, a frequency deviating from this is measured, in most cases a higher frequency. The frequency increase is solely attributable to the positive pressure which has built up in the meantime. During the first measurement, carried out directly after the pressing on of the crown cap, the frequency is e.g. between 7 and 8 kHz, the differences between the individual bottles being caused by differences in the thickness of the crown cap material and the varying closure force of the closure chucks (closure parameter). After 5 minutes, a positive pressure e.g. of 1 bar has built up, which led to a frequency higher by 0.7 kHz being measured during the second measurement that was then carried out. This frequency increase lies within the fluctuation band which is caused by differences in the closure parameters. A frequency measurement only after the build-up of the internal pressure would therefore not permit a reliable statement regarding the tightness of the bottle closure; it would not be possible to distinguish with certainty between frequency deviations caused by closure parameter differences and those which can be attributed to an increase in the internal pressure.

The marking can take place in the form of a bar-code. In practice, this kind of marking can run into difficulties, as a bar-code would then have to be attached to the container or closure, something which, up to now, has not been accepted by consumers. The marking can also be attached with UV ink. The marking, i.e. the allocation of specific recorded values to the containers, can take place by means of a transponder.

Instead of using a bar-code, UV ink or transponder, the container or the closure can also be marked magnetically. This can take place via the container or closure material, e.g. using ferromagnetic material, or through the use of a magnetizable coating, similar to that in the case of computer diskettes. In principle, analog or digital operation is possible, i.e. via the strength of the magnetic field or only via the direction. The two processes can also be combined.

The magnetic marking can take place by three different methods.

a) Analog encryption of the information
b) Analog encryption of the information with reference marking
c) Digital encryption of the information A disadvantage of the analog method is that effects which influence the intensity of the magnetization have to be monitored. These include e.g. the unavoidable fluctuations in material thickness and composition of the closure. This can be corrected by firstly impressing a write pulse of defined amplitude onto the top and reading it. The magnetizability of the top can then be deduced from the level of the read signal. On the basis of this information, the necessary amplitude of the write pulse can then be calculated for information storage. Another correction possibility consists of carrying out the magnetization simultaneously in several directions. For example, in the plane of the closure and perpendicular thereto. The magnetization is then read again in all three spatial directions and the magnetization in the plane of the closure, e.g. in the centre of the closure, is calculated from the magnetization in two of the three directions. The information then remains in the angle of the vector of the overall magnetic field strength above the plane of the closure. Therefore, no alignment of the bottle is necessary. The effects of the magnetizability of the individual closures are calculated from this.

Upon the analog encryption of the information, the height tolerances of the bottles are also to be borne in mind.

Possible Measures

With the process described above, in which firstly a write pulse of defined amplitude is impressed onto the closure, the height tolerance is corrected simultaneously. Height tolerances of the bottles and thus of the distance between the closure and the write and/or read head can also be actively measured and integrated into the evaluation of the magnetic field strength. Finally, the position of the write and read heads can be actively tracked to the bottle height.

These disadvantages of the analog method can also be dealt with by attaching a reference pulse of constant amplitude to the closure. This constant reference pulse is then used again to reconstruct the information in the variable write pulse. In this way, the problems described above are solved simultaneously.

The digital method naturally has a better signal-to-noise ratio, as only the direction of the magnetic field is used as an information unit. Therefore, different areas of the top have to be magnetized in different directions.

For example, the closure can be magnetized orthogonally to the closure surface plane in different orientations. Simple patterns for the magnetization are strips of different polarity or, in order to maintain the rotation symmetry, concentric rings of different polarity.

All these methods are possible. They differ only in the costliness of the process and in the amount of information which can be obtained and packed into the marking.

Finally, an increasing of the information density is also possible by combining the analog and digital processes. For example, concentric rings of differing orientation are applied to the cover, and these then also in several levels of magnetic field intensity which can be easily distinguished from one another. Every additional level then increases the maximum possible information quantity count (i.e. of the distinguishable states).

Both the magnetization and the reading of the closures are preferably independent of direction, i.e. the magnetization pattern is rotationally symmetrical to the rotation axis of the containers, e.g. of glass drink bottles with crown- or screw-caps. The closure can be magnetized in concentric rings, as already mentioned, for this purpose. Another possibility is to store the information in the direction of the magnetization. Because of the required independence from direction or rotational symmetry, an angular range of 180° is all that is available overall.

As far as the design of the write head is concerned, a live coil, possibly with a highly permeable core, is already sufficient to write analog signals. The strength of the analog signal is regulated by the coil current. A field formation can be produced by suitable pole shoes on the soft magnetic core of the coil. If the rotational symmetry is to be maintained, it is simplest to apply the magnetization pulse perpendicularly to the plane of the top. The information is then included in the amount and in the sign of the magnetization. To this end, the coil is to be attached as a write head above the passing container and an electrical pulse of corresponding strength produced when a container is located under the write head.

A simultaneous magnetization in several directions can be realized by installing two or more coils which are triggered at the same time. Here too, magnetic field strength and magnetic field form can naturally be optimized by suitably shaped pole shoes.

Magnetization patterns in concentric rings on the closure can be realized by nested coils which have variable current direction and current.

The magnetic field of a live wire is sufficient to align electron spins of the closure material. For example, strip patterns can thus be applied to the closures by parallel live wires. Patterns comprising for example ten strips can be produced in this way. Rotationally symmetrical magnetization patterns can correspondingly be produced by annular wires.

Pointwise high magnetic field strengths, which can locally align the orientation of the electron spin of the material comprising the top can be produced by tips made of highly permeable material.

Depending on the complexity of the patterns, the read head consists of one or more magnetic field sensors. The information is reconstructed again by analysis software from their output signals. Hall sensors are sufficient for simple magnetization patterns. Magnetoresistive sensors are preferably used, being much more sensitive than Hall sensors. The considerably more expensive SQUIDS or the so-called GMRs (Giant Magnetic Resistivity Detectors) can also be used of course, but in general however, magnetoresistive sensors are sufficient and deliver a resolution sufficient for reading the magnetization patterns again, even at a distance of several millimeters. Their output signals deliver locally resolved information regarding the amount and direction of the measured magnetic field.

When magnetizing ferromagnetic materials, dependency on the previous history, that is the hysteresis, has to be considered. The flux density B which can be obtained in the material depends not only on the impressed outer magnetic field strength $H_{ext}$ but also on the previous history of the material.

For both the analog and, in a limited form, the digital method of magnetization, it is therefore advantageous to produce a defined initial magnetization for all closures in order to increase the reproducibility of the write pulses. This means that an additional erase head is also needed, upstream from the write head.

A saturation magnetization is one suitable defined initial magnetization and a demagnetization of the closures is another. Saturation magnetization is achieved by a very strong outer magnetic field. Demagnetization is achieved by means of a magnetic alternating field of decreasing intensity which is produced by means of a coil carrying alternating current. If the container closure is transported past the erase head, it automatically experiences a decreasing magnetic field, even if the coil current is constant. For demagnetization, an erase head is therefore sufficient, which is positioned a small distance above the container closures which are passing along beneath it and fed with alternating current of constant strength. The diameter of the erase head is larger than the diameter of the closure which is to be demagnetized in order to demagnetize the latter over all of its surface.

When writing, a similar problem arises if the write head is operating with coils which have soft-magnetic cores. After a write pulse of high field strength, a write pulse having the same direction cannot be produced which is smaller than the remanence belonging to the first pulse. To solve this problem, the following measures can be taken:

a) Only use the range between remanence and saturation magnetization as the dynamic range of the write head.

b) Between the bottles, provide an erase pulse for the write head by means of alternating current.

c) Pre-set, not the current, but the magnetic field of the write pulse. The magnetic field must then be measured and the currents of the write head set accordingly.

The more elegant process is naturally to integrate the write head and erase head in one head. The closure and the write head are thereby simultaneously de-magnetized. For this purpose, only a suitable write pulse need to be generated.

DESCRIPTION OF THE DRAWINGS

The present invention is described herein with reference to the accompanying drawings, in which like numerals designate corresponding parts in the figures, wherein.

DETAILED DESCRIPTION OF THE INVENTION

Figure 1:
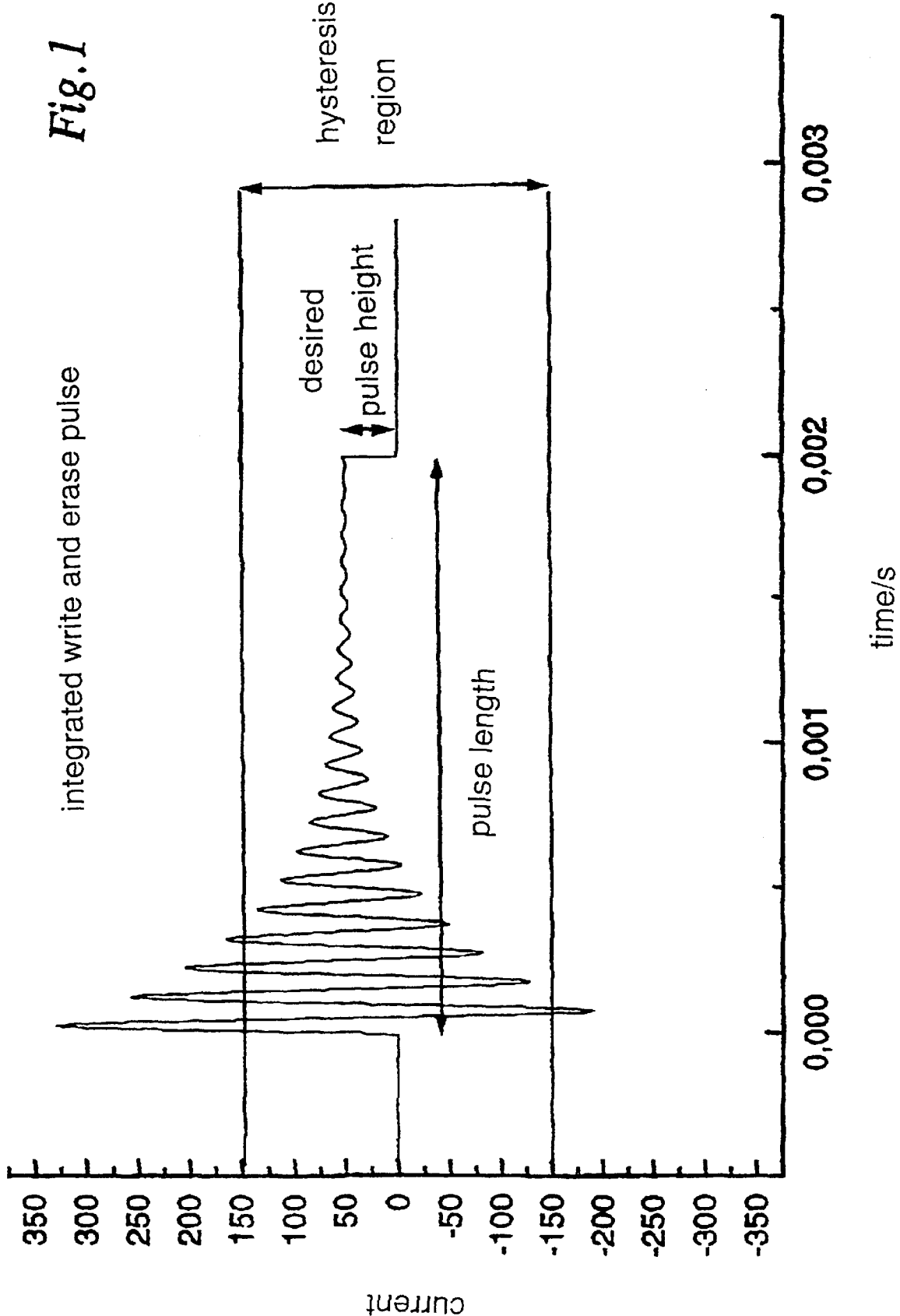
FIG. 1 is a graph illustrating an embodiment of a high decreasing alternating current, which returns to zero during the pulse duration, as applied over the desired direct-current pulse of the present invention.
Figure 2:
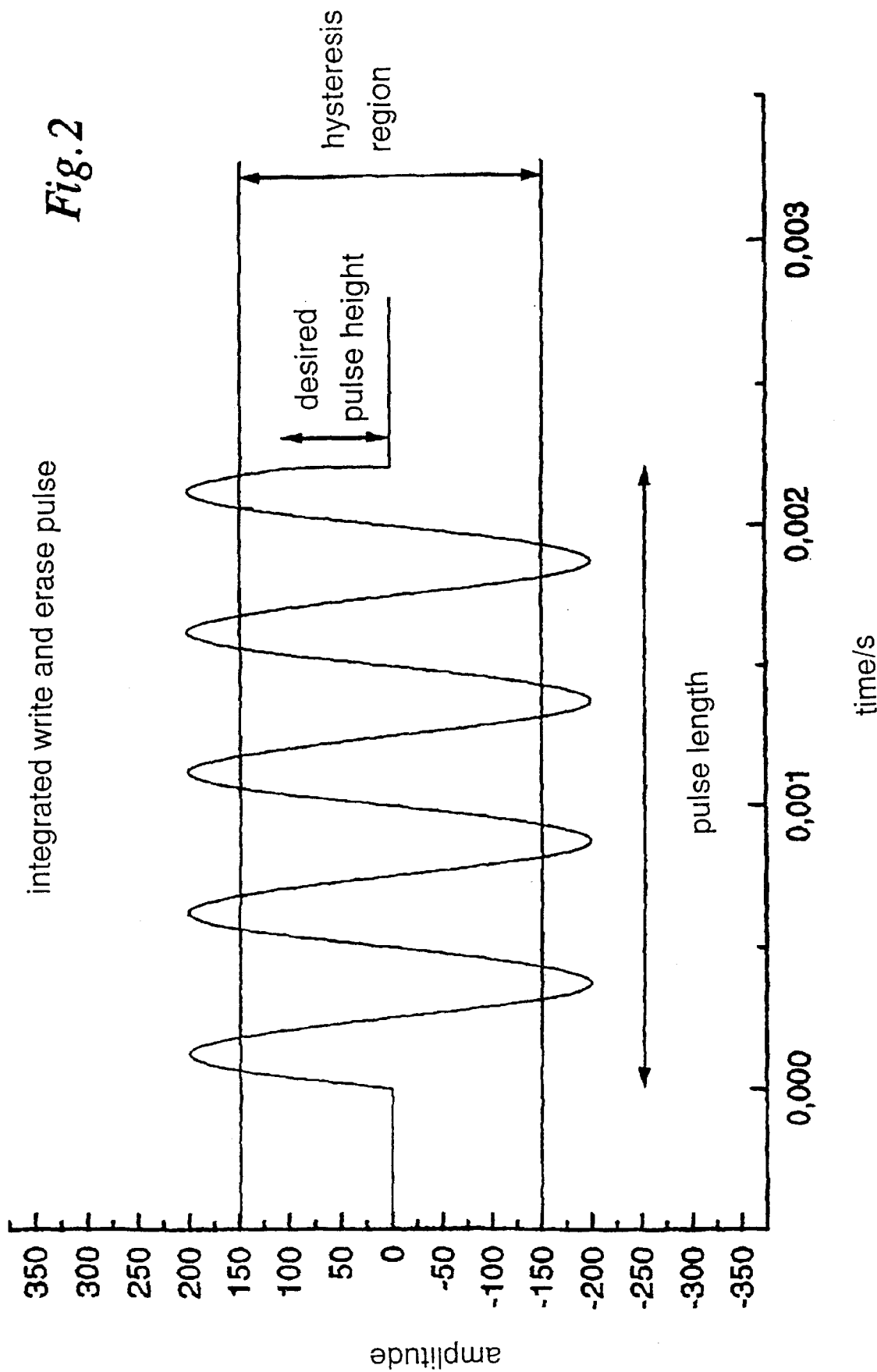
FIG. 2 is a graph illustrating an embodiment of the whole hysteresis curve for each closure (and the coil material) by means of a high alternating current of the present invention.

The coding or marking of the individual bottles can be used not only for monitoring the tightness of the closure of glass bottles, but also for measuring the tightness of PET bottles. For this purpose, the fill level is measured directly after the closing of the PET bottle and then at a later time, and it can be established very precisely from the comparison whether the bottle is tight.

Normally, the pressure builds up after closure, as $CO_2$ is released. The PET bottle expands somewhat and the apparent fill level thereby drops a certain amount. If the PET bottle leaks in the area of the liquid phase, the fill level drops further. If on the other hand, the leak is in the upper area, i.e. where the air bubble is located, the fill level does not sink. In the case of plastic bottles, a leak can therefore be established by comparing the fill level at two different times.

In the following, the invention is explained in more detail using an embodiment which relates to the testing of the tightness of beer bottles which are closed with a crown cap made of steel. The bottles are transported at close intervals or even under back pressure on a conveyor belt with a throughput of up to 80,000 bottles per hour.

To test for tightness and the correct closure, an apparatus is used with a first device to measure the frequency of the mechanical oscillations of the closure, with an erase head, a write head, a read head, and with a second device to measure the frequency of the mechanical oscillations of the closure as well as the associated accompanying electronics.

Firstly, the frequency of the mechanical oscillations of the closure of a filled bottle transported on a link chain conveyor is measured. This is carried out in known manner by impacting the closure with a short magnetic pulse and then recording the frequency of the oscillations of the closure with a microphone. This frequency lies in the range from e.g. 7 to 8 kHz.

The closure is then de-magnetized using an erase head. A coil with a soft magnetic iron core serves as an erase head, which coil is operated at a continuous alternating current of a frequency of approximately 100 Hz and a current strength of several amperes. The diameter of the coil is 3 cm and is thus somewhat larger than the diameter of the closures to be marked. The coil has approximately 50 turns. The erase head erases all signals present on the closure; it therefore completely de-magnetizes all closures of the bottles which are passed under it at a distance of 5 mm.

The write head is constructed similarly to the erase head and is fed with a short direct-current pulse of between 1 and 10 amperes when the closure to be described is located directly below it at a distance of approximately 3 mm. The write head orientates the Weiβ domains of the ferromagnetic material perpendicular to the plane of the closure and the residual magnetic field strength (remanence) of the closure material can be controlled via the strength of the direct-current pulse. The correct time for the magnetization pulse is determined by a light barrier which displays the arrival of a container.

The marking of the closures is in analog form. The closures are magnetized perpendicular to their surface. Bottles having closures of a frequency outside the range of 7 to 8 kHz are immediately rejected, as they are obviously defective. The range of 7 to 8 kHz is reproduced in analog form by the strength of the magnetization applied. A frequency of 7 kHz is reproduced by a field strength of 1 gauss measured at a distance of 3 mm from the closure in the case of a downwardly-directed magnetic field, and a frequency of 8 kHz by a field strength of 1 gauss in the case of an upwardly-directed magnetic field. Overall, a range of 2 gauss is therefore available for the reproduction of the frequency range of 7 to 8 kHz. The intermediate range is interpolated approximately linearly.

The bottles then pass through a labelling machine and after 5 minutes the magnetically encrypted information is firstly read from the closure by the read head. Using an inductive distance meter, the vertical position of the closure and thus the distance between read head and closure are also measured.

A single-axis, magnetoresistive sensor serves as read head. The reading axis is aligned perpendicular to the plane of the closure, the distance to the closures is approximately 5 mm and the bottles are passed through under the sensor with the closures. The output signals of the sensor, measuring some mV, must then still be electronically processed and amplified. At this point, an adjustment of the differences in the height of the individual bottles takes place, for which the signal of the inductive distance meter is processed. The deviations in the strength of the magnetization and/or the read signal which result both upon writing and upon reading are thereby adjusted. The transmitted information then remains in the maximum stroke of the magnetic field strength of the closure just measured. This stroke is ascertained from the output signals of the magnetic sensor by the evaluation software and indicates the frequency ascertained during the first frequency measurement of the mechanical oscillations of the closure. The reading is in turn triggered by a light barrier.

Finally, the present frequency of the mechanical oscillations of the closure is ascertained once more. During this second measurement, the same procedure is used as in the first measurement. The pressure that has built up in the bottle between the two measurements can now be ascertained from the difference in the values obtained in the first and in the second measurement for the mechanical oscillations of the closure.

Whereas the absolute values of the frequencies depend very much on the closure parameters, the frequency difference is not influenced by them. The errors associated with the writing and reading of the magnetic marking are considerably smaller than the frequency shift caused by the closure parameters.

If the ascertained frequency difference shows an unacceptably low internal pressure, this is an indication of a leaky closure and the bottle concerned is rejected.

What is claimed is:

1. A method of testing the tightness and/or correct closure of a plurality of identical containers which are transported on a conveyor, the method comprising the following steps:

transporting the containers consecutively at brief time intervals on the conveyor;

sealing the containers by attachment of closures;

measuring an internal-pressure characteristic upon attachment of the closures to the containers;

marking the containers, not later than upon attachment of the closures, in a way which permits allocation to the respective container of the internal-pressure characteristic measured upon attachment of the closures;

measuring the internal-pressure characteristic of the containers at a time interval after attachment of the closures;

allocating to the respective container by means of the marking the internal-pressure characteristic measured upon attachment of the closure; and ascertaining the internal pressure of the container from the value of the internal-pressure characteristic measured at the time interval after the attachment of the closure and comparison with the value of the internal-pressure characteristic measured upon attachment of the closure.

2. The method of claim 1, wherein the step of measuring the internal-pressure characteristic of the containers at a time interval after the attachment of the closure takes place at a time interval relative to the attachment of the closure which is so great that a plurality of containers is conveyed past a specific point on the conveyor within this time interval.

3. The method of claim 1, wherein the marking reproduces the value for the respective container of the internal-pressure characteristic.

4. The method of claim 1, wherein the marking consists of a magnetization of the closure.

5. The method of claim 4, wherein the magnetization of the closure contains data in analog form.

6. The method of claim 1, wherein the containers and the closures consist of rigid material, the internal-pressure characteristic is the oscillation frequency of the closures and the marking reproduces the oscillation frequency recorded upon attachment of the closures.

7. The method of claim 1, wherein the containers consist of flexible material, the internal-pressure characteristic is the fill level and the marking reproduces the fill level recorded upon attachment of the closures.

8. A method of testing the tightness and/or correct closure of a plurality of identical containers which are transported on a conveyor, the method comprising the following steps:

transporting the containers consecutively at brief time intervals on the conveyor;

sealing the containers by attachment of closures;

recording parameters of the closures or containers upon attachment of the closures to the containers, knowledge of those parameters being necessary to ascertain the internal pressure from a measurement of an internal-pressure characteristic;

marking the containers, not later than upon attachment of the closure, in a way which permits allocation to the respective container of the parameters recorded upon attachment of the closures;

measuring the internal-pressure characteristic of the containers at a time interval after attachment of the closures;

allocating to the respective container by means of the marking the parameters recorded upon attachment of the closure; and ascertain the internal pressure of each of the containers from the value of the internal-pressure characteristic measured at the time interval after the attachment of the closure and comparison with the value of the internal-pressure characteristic measured upon attachment of the closure.

9. The method of claim 8, wherein the step of measuring the internal-pressure characteristic of the containers at a time interval after the attachment of the closure takes place at a time interval relative to the attachment of the closure which is so great that a plurality of containers is conveyed past a specific point on the conveyor within this time interval.

10. The method of claim 8, wherein the marking reproduces the value for the respective container of the internal-pressure characteristic.

11. The method of claim 8, wherein the marking consists of a magnetization of the closure.

12. The method of claim 8, wherein the magnetization of the closure contains data in analog form.

13. The method of claim 8, wherein the containers and the closures consist of rigid material, the internal-pressure characteristic is the oscillation frequency of the closures and the marking reproduces the oscillation frequency recorded upon attachment of the closures.

14. The method of claim 8, wherein the containers consist of flexible material, the internal-pressure characteristic is the fill level and the marking reproduces the fill level recorded upon attachment of the closures.

15. A method of testing the tightness and/or correct closure of a plurality of identical containers which are transported on a conveyor, the method comprising the following steps:

transporting the containers consecutively at brief time intervals on the conveyor;

sealing the containers by attachment of closures;

measuring an internal-pressure characteristic and recording parameters of the closures or containers upon attachment the closures to the containers, knowledge of those parameters being necessary to ascertain the internal pressure from a measurement of the internal-pressure characteristic;

marking the containers, not later than upon attachment of the closure, in a way which permits allocation to the respective container of the internal-pressure characteristic and the parameters measured and, respectively, recorded upon attachment of the closures;

measuring the internal-pressure characteristic of the containers at a time interval after attachment of the closures;

allocating to the respective container by means of the marking the internal-pressure characteristic and the parameters measured and, respectively, recorded upon attachment of the closure; and ascertaining the internal pressure of the container from the values of the internal-pressure characteristic and the parameters measured and, respectively, recorded at the time interval after the attachment of the closure and comparison with the value of the internal-pressure characteristic measured upon attachment of the closure.

16. The method of claim 15, wherein the step of measuring the internal-pressure characteristic of the containers at a time interval after the attachment of the closure takes place at a time interval relative to the attachment of the closure which is so great that a plurality of containers is conveyed past a specific point on the conveyor within this time interval.

17. The method of claim 15, wherein the marking reproduces the value for the respective container of the internal-pressure characteristic.

18. The method of claim 15, wherein the marking consists of a magnetization of the closure.

19. The method of claim 15, wherein the magnetization of the closure contains data in analog form.

20. The method of claim 15, wherein the containers and the closures consist of rigid material, the internal-pressure characteristic is the oscillation frequency of the closures and the marking reproduces the oscillation frequency recorded upon attachment of the closures.

21. The method of claim 15, wherein the containers consist of flexible material, the internal-pressure characteristic is the fill level and the marking reproduces the fill level recorded upon attachment of the closures.

* * * * *